April 5, 1966　　　A. J. THOMPSON　　　3,244,971
THICKNESS MEASURING GAUGE
Filed Oct. 9, 1963　　　　　　　　　　　2 Sheets-Sheet 1
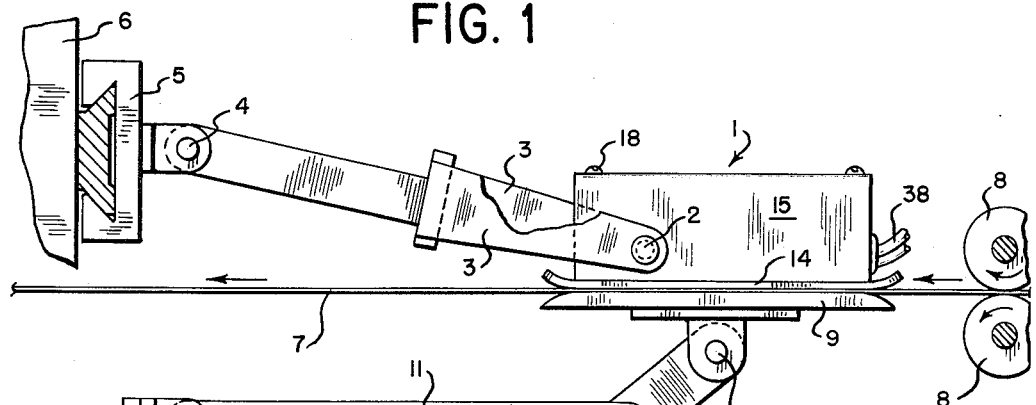
FIG. 1
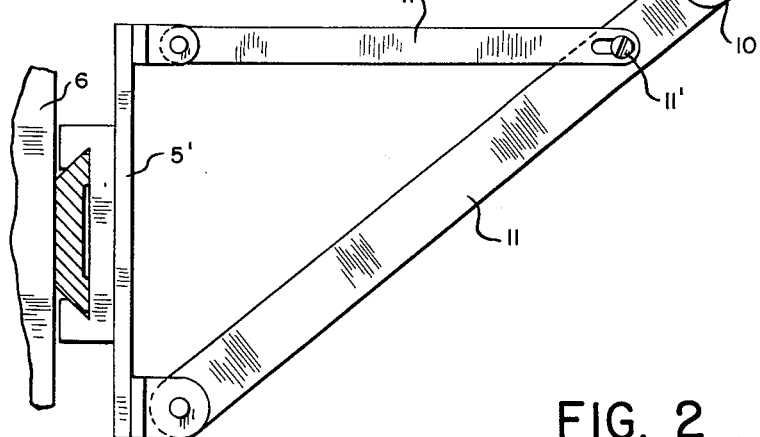
FIG. 2
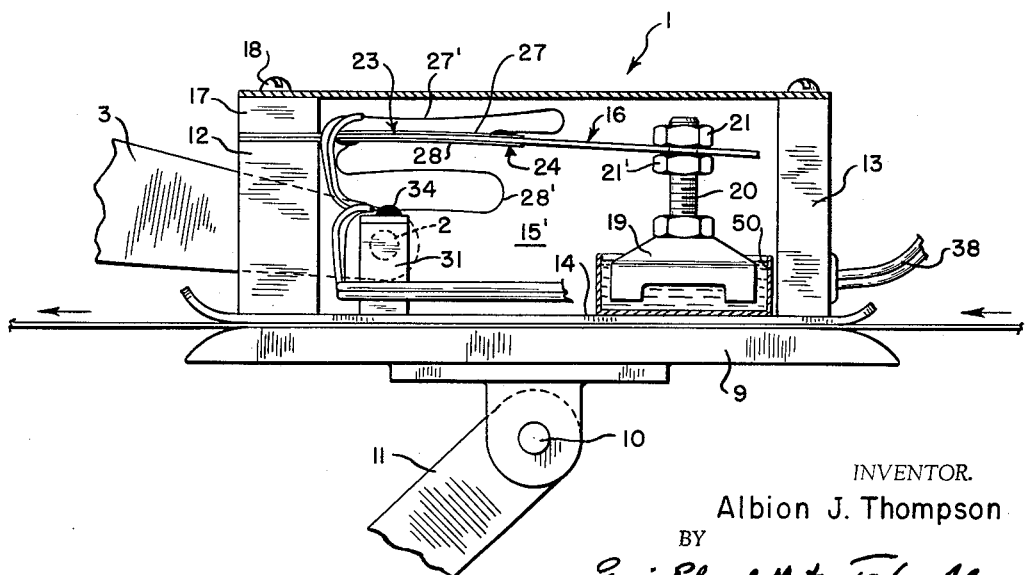
INVENTOR.
Albion J. Thompson
BY
ATTORNEYS April 5, 1966　　　A. J. THOMPSON　　　3,244,971
THICKNESS MEASURING GAUGE Filed Oct. 9, 1963　　　　　　　　　　　　　2 Sheets-Sheet 2

INVENTOR.
Albion J. Thompson
BY
Pennie, Edmonds, Morton, Taylor & Adams
ATTORNEYS

United States Patent Office 3,244,971
Patented Apr. 5, 1966

3,244,971
THICKNESS MEASURING GAUGE
Albion J. Thompson, Millinocket, Maine, assignor to Great Northern Paper Company
Filed Oct. 9, 1963, Ser. No. 314,915
15 Claims. (Cl. 324—34)

The present invention relates to a thickness measuring gauge for continuously measuring the thickness of a non-magnetic material and more particularly to a gauge in which the actual sensing means comprises a magnetic element disposed at a point remote from the material being measured and adapted to move toward and away from the material as its thickness changes by amounts proportional to such changes.

The present invention has particular application in the paper manufacturing field where for such purposes as quality control it is desired to continuously measure the thickness of the paper as it issues from typical fabricating or treating machines. In such situations the paper may be passed over a ferromagnetic guide with one surface of the paper in engagement therewith and the thickness gauge of the present invention can then be mounted on a follower engaging the opposite surface of the paper. As the thickness of the paper varies, the follower will cause the magnetic sensing means disposed within the magnetic field of attraction existing between the magnet and guide to change its position with respect to the paper whereby this later movement of the magnet will indicate the change in thickness of the paper.

Although the thickness gauge of the present invention has particular application in the paper manufacturing field, it is to be understood that it can also be used for measuring the thickness of any non-magnetic material which is backed by a suitable magnetic material in a manner such that a magnetic field of attraction is set up through the non-magnetic material.

In either situation, it is a feature of the present invention that the sensing means for indicating changes in thickness of the material be disposed at a point remote from the material whereby accurate thickness readings may be continuously taken of moving material which are not affected by the running speed of the material.

A fuller understanding of the invention will be obtained from a reading of the following detailed description and examination of the accompanying drawings of which:

FIG. 1 is a side elevation of the thickness gauge showing its mounting in a conventional web fabrication machine;

FIG. 2 is a side elevation of the thickness gauge partially in cross-section and with parts removed to show the interior thereof;

Figure 3:
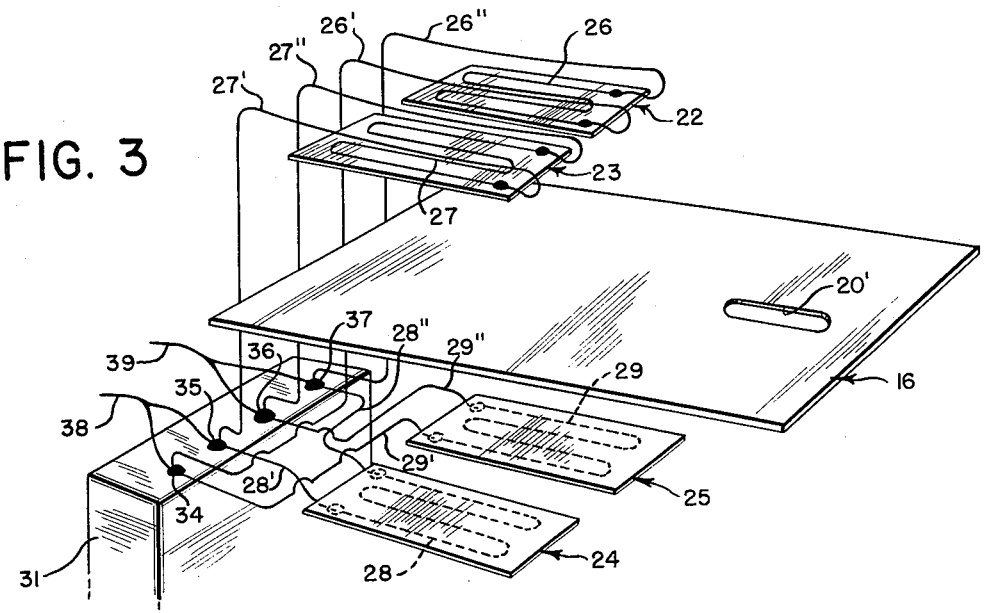
FIG. 3 is an exploded view of the cantilever beam shown in FIG. 2.

As shown in FIG. 1, the thickness gauge comprises a sensing head generally designated as 1 and pivotally mounted at 2 on the free end of a pair of arms 3. The arms are pivotally secured at 4 to a suitable movable support or carriage 5 in turn slidably mounted on a conventional material fabricating or treating apparatus 6. The sensing head is adapted to rest on the upper surface of a moving web of material 7 which is fed thereunder by suitable means such as the feed rollers 8. Due to the carriage connection with the machine 6, the head is adapted to be reciprocated transversely of the direction of movement of the web during the fabricating or treating operation to give thickness readings at different points along the lateral extent of the web. Disposed immediately below the sensing head and slidably engaging the undersurface of the material 7 is a ferromagnetic guide or backup member 9. As shown, the guide member preferably comprises an elongated bar although it is to be understood that other guide means such as an idler roll could be used equally as well. The bar 9 is pivotally secured at 10 to the supporting arms 11 which are, in turn, pivotally connected to the carriage 5', the carriage 5' being slidably mounted on the fabricating or treating machine 6 for movement with the sensing head back and forth across the web. The arms 11 are adjustably connected together by the locking member 11' whereby the vertical position of the guide 9 may be fixed at the desired height.

As shown in FIG. 2, the sensing head comprises end brackets 12 and 13 having a non-magnetic follower shoe 14 fixed thereto at their lower ends. The end brackets are closed along the sides of the sensing head by means of side plates 15, 15' to which the arms 3 may be secured as indicated. A flexible reed or cantilever beam 16 is secured to the upper end of the bracket 12 by means of a plate 17 and screw 18. The other end of this beam is free and provided with a thickness sensing means comprising a depending electric or permanent magnet 19 which is adapted to be positioned within the magnetic field of attraction created with respect to the ferromagnetic guide 9 for movement toward and away from the web of ferromagnetic guide member as the thickness of the web being passed between the guide and follower 14 varies as will be more fully described below. The magnet and guide members 19 and 9, respectively, define a magnet couple. The magnet itself is fixed to one end of the threaded rod 20 which extends through an aperture 20' in the free end of the beam and adjustably secured thereto by means of the nuts 21, 21'. The magnet is normally spaced from the follower shoe 14 and its position may be adjusted through means of the nuts 21, 21'. As shown in FIG. 2, damping means are provided for eliminating undesirable movement of the sensing magnet that might be caused by extraneous vibrations created in the fabricating or treating apparauts. As shown, such damping means includes a container 50 mounted on the follower shoe directly below and encompassing the magnet 19. The container is adapted to be filled with a suitable fluid so that the magnet will be submerged therein and its movement toward and away from the guide 9 damped.

Figure 4:
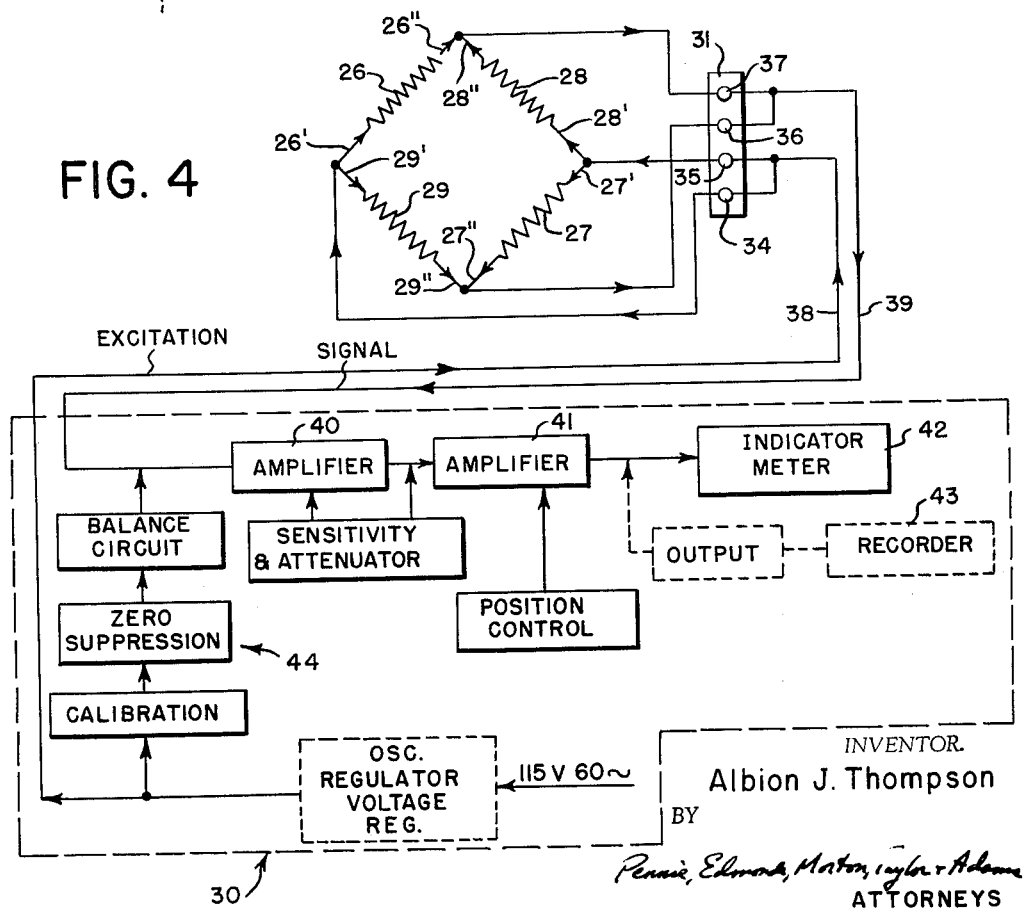
FIG. 4 is a circuit diagram illustrating the control circuit of the present invention.

The cantilever beam at its rearward end is provided with strain gauges 22–25 bonded to the top and bottom surfaces thereof as shown in FIG. 2. Two strain gauges are provided on each surface of the beam with the gauges on the top surface directly opposite those on the bottom surface. The gauges 22–25 include resistance members 26–29, respectively, which are generally disposed along the longitudinal axis of the beam. One end of each resistance member is connected to a source of current through input conductors 26', 27', 28' and 29' while the other end of each member is connected through output conductors 26", 27", 28" and 29" to a suitable control cabinet 30. The wiring of the resistance members of the train gauges is so arranged to form a Wheatstone bridge circuit, and as shown in FIGS. 3 and 4, the conductors leading to and from each of the resistance members are connected to a suitable terminal black 31 having input terminals 34, 35 and output terminals 36, 37. More specifically the input conductors 26' and 29' leading to the resistance members 26 and 29, respectively, are connected to the input terminal 34 while the input conductors 27' and 28' leading to the resistance members 27 and 28, respectively, are connected to the input terminal 35; and the output conductors 27" and 29" leading from the resistance members 27 and 29, respectively, are connected to the output terminal 36 while the output conductors 26" and 28" leading from the resistances 26 and 28, respectively, are connected to the output terminal 37. This construction whereby the respective resistances are connected together in the form of a Wheatstone bridge permits the changes in the resistance to current passing through the respective resistances to be used to generate a signal representative of the degree of unbalance of the circuit with the degree of unbalance being representative of the thickness of the web as more fully described below.

The conductors leading to the terminal block 31 from the strain gauges 22–25 are connected to the control cabinet 30 by means of the conductors 38 and 39. As shown, conductor 38 carries the exciting current to the input terminals 34 and 35 from a suitable source of potential while conductor 39 is connected to the output terminals 36 and 37 for carrying the electrical signal back to the control panel. The signal as previously stated represents the condition of balance or unbalance of the bridge circuit and as shown in FIG. 4 is fed through suitable amplifiers 40 and 41 to an indicating meter 42 that may be calibrated in terms of thickness measurements directly proportional to the degree of unbalance of the circuit. As indicated in FIG. 4, the signal may also be fed to a suitable recorder 43 for continuously recording these measurements, if desired.

Inside the control cabinet 30, the conductors 38 and 39 are connected together by conventional control means generally designated by 44 whereby the circuit may be balanced at a predetermined value corresponding to a predetermined thickness value. In this manner the meter 42 may be present at "0" and the amount of change in the thickness of the web may be read directly.

In accordance with the teachings of the present invention, the cantilever beam 16 is constructed whereby the greatest flexing will occur in the area of the bonded strain gauges so that flexing of the beam from a predetermined reference position will cause a corresponding flexing of the strain gauges. More specifically, the construction is such that flexing of the beam in one direction will cause the resistance members of the strain gauges on one side of the beam to stretch and the resistance members on the other side to contract while flexing of the beam in the other direction will cause a reverse effect on the respective strain gauges. Stretching of the resistance members will result in increasing their resistance while compression thereof will have the opposite effect. With the wiring arrangement connecting the various resistance members together to form a Wheatsone bridge circuit so that changes in the resistances of the strain gauges will have the effect of changing the balance of the bridge circuit, the gergee of unbalance will indicate the distance the beam has flexed from its predetermined reference position.

As indicated above, the web of material being fed over the ferromagnetic guide 9 has the follower shoe 14 of the sensing head resting on its upper surface and the magnet 19 of the sensing head disposed within the magnetic field of attraction existing between the magnet and guide. Accordingly, as the thickness of the moving web decreases, for example, the follower will move closer to the guide. This, in turn, will increase the magnetic force of attraction between the magnet and guide and cause the magnet to move toward the web through a distance which will be proportional to the decrease in thickness of the web. Movement of the magnet in this manner will cause a downward flexing of the beam from its predetermined reference position through a distance which is also proportional to the decrease in thickness of the web. It is therefore apparent that the measurement being taken of the degree of unbalance of the circuit connecting the strain gauges together will also be a measurement of the decrease in thickness of the web.

In order to measure an increase in the thickness of the web it is necessary that the above mentioned reference position of the beam be such that the magnet may move away from the web as the follower moves away from the guide. To permit this movement, the original position of the magnet within the magnetic field of attraction existing between the magnet and guide is close enough to the guide so as to cause a slight bending of the beam as shown in FIG. 2. In this manner, the tendency of the beam to return to the position it would assume if no magnetic force of attraction existed will cause the magnet to move away from the web as the force of attraction between the magnet and guide is lessened.

With this construction, it can be seen that as the thickness of the web changes, the follower will move toward or away from the guide by a distance corresponding to this change and that the magnet will in turn, move through an additional distance proportional to the change in the magnetic force of attraction between the magnet and guide which latter movement may be used as an indication of the change in thickness of the web. With the above construction it is to be noted that the actual thickness sensing magnet of the gauge may be positioned at a point spaced from the travelling web whereby accurate measurements are made possible.

In setting the thickness gauge for operation, the follower shoe 14 is placed on the upper surface of the web 7 directly opposite the ferromagnetic guide means 9. The magnet is then adjusted on the rod 20 until a force of attraction is created between the magnet and ferromagnetic guide. The position of the magnet within the field of attraction is set so as to bend the cantilever beam a slight distance toward the shoe to a predetermined reference position; and at this reference position the circuitry of the control cabinet is set to a corresponding reference position whereby flexing of the beam in response to movement of the magnet will cause the strain gauges to produce a signal representative of the thickness of the web.

While a particular construction of the thickness gauge has been shown and described, it is to be understood that various changes may be made without departing from the scope of the invention as defined in the following claims.

I claim:
1. Apparatus for measuring the thickness of a moving web of material comprising:
 (a) a flexible beam adapted to overlie one surface of said web at a distance spaced therefrom and having a predetermined flexing zone;
 (b) movable follower means opeartively connected to said beam for moving said beam toward and away from the other surface of said web by distances substantially equal to changes in the thickness of said web;
 (c) sensing means supported by said beam so as to overlie said one surface at a distance spaced therefrom and responsive to movement of said follower means for flexing said beam in said flexing zone from a reference position toward and away from said one surface by distances proportional to decreases and increases in the thickness of said web; and
 (d) means responsive to flexing of said beam for producing a signal representative of the thickness of said web.

2. Apparatus for measuring the thickness of a moving web of material comprising:
 (a) a follower adapted to rest on one surface of said web and move toward and away from the opposite surface thereof as the thickness of the web varies;
 (b) a flexible beam fixed at one end to said follower with the other end thereof free and spaced from said follower, said beam having a predetermined flexing zone;
 (c) sensing means positioned on the free end of said beam and spaced from said follower for flexing the same in said flexing zone from a reference position toward and away from said one surface of the web by distances proportional to decreases and increases in the thickness of said web; and (d) means responsive to flexing of said beam for producing a signal representative of the thickness of said web.

3. Apparatus for measuring the thickness of a moving web of material as set forth in claim 2 further comprising damping means operatively connected between said sensing means and follower.

4. Apparatus for measuring the thickness of a moving web of material as set forth in claim 2 within the signal producing means includes:
   (a) electrically resistive material disposed on opposite surfaces of said beam in said flexing zone adapted to flex therewith;
   (b) conductors for connecting each of said resistive materials to a source of potential; and
   (c) circuit means responsive to flexing of said material on opposite sides of said beam for producing an electrical signal representative of the degree of flexing of said materials.

5. Apparatus for measuring the thickness of a moving web of material as set forth in claim 2 wherein the signal producing means includes:
   (a) a pair of electrically resistive materials on opposite surfaces of said beam in said flexing zone and adapted to flex therewith;
   (b) conductors for connecting each of said resistive materials to a source of potential; and
   (c) circuit means connecting said resistive materials together to form a Wheatstone bridge circuit with the resistive materials on one side of said beam forming opposite legs of said bridge whereby changes in the resistance of the materials on opposite sides of said beam caused by flexing thereof will produce an electrical signal representative of the thickness of said web.

6. Apparatus for measuring the thickness of a web of non-magnetic material moving over a ferromagnetic guide means comprising:
   (a) a non-magnetic follower adapted to rest on the surface of said web disposed opposite said guide means and move toward and away from said guide means in direct response to changes in the thickness of the moving web;
   (b) a flexible beam fixed at one end to said follower with the other end thereof free and spaced from said follower, said beam having a predetermined flexing zone;
   (c) a magnet secured to the free end of said beam at a position spaced from said follower and responsive to movement of said follower for flexing said beam in said flexing zone from a reference position toward and away from said follower by distances proportional to decreases and increases in the thickness of said moving web; and
   (d) means responsive to flexing of said beam for producing a signal representative of the thickness of said web.

7. Apparatus for measuring the thickness of a moving web of non-magnetic material as set forth in claim 6 wherein said follower is provided with a container holding a fluid and said magnet is substantially submerged in said fluid.

8. Apparatus for measuring the thickness of a moving web of non-magnetic material as set forth in claim 6 wherein the signal producing means includes:
   (a) electrically resistive material disposed on opposite surfaces of said beam in said flexing zone adapted to flex therewith;
   (b) conductors for connecting each of said resistive materials to a source of potential; and
   (c) circuit means responsive to flexing of said material on opposite sides of said beam for producing an electrical signal representative of the thickness of said web.

9. Apparatus for measuring the thickness of a moving web of non-magnetic material as set forth in claim 6 wherein the signal producing means includes:
   (a) a pair of electrically resistive materials on opposite surfaces of said beam in said flexing zone and adapted to flex therewith;
   (b) conductors for connecting each of said resistive materials to a source of potential; and
   (c) circuit means connecting said resistive materials together to form a Wheatstone bridge circuit with the resistive materials on one side of said beam forming opposite legs of said bridge whereby changes in the resistance of the materials on opposite sides of said beam caused by flexing thereof will produce an electrical signal representative of the thickness of said web.

10. Apparatus for measuring the thickness of a moving web of material comprising:
    (a) guide means over which said web is adapted to move with one surface of said web in engagement therewith;
    (b) follower means disposed opposite said guide means;
    (c) means for urging said follower means into engagement with the opposite side of said web to move said follower toward and away from said guide means by distances substantially equal to changes in the thickness of said web;
    (d) a flexible beam fixed at one end to said follower with the other end thereof free and spaced from said web;
    (e) sensing means responsive to movement of said follower means for flexing said beam from a reference position toward and away from said web by distances respectively proportional to decreases and increases in the thickness of the web;
    (f) means for mounting said sensing means on the free end of said flexible beam at a position spaced from said web; and
    (g) means responsive to flexing of said beam toward and away from said web for producing a signal representative of the thickness of said web.

11. Apparatus for measuring the thickness of a moving web of non-magnetic material comprising:
    (a) ferromagnetic guide means;
    (b) feeding means for moving a web of non-magnetic material along the guide means with one surface of the web in engagement therewith;
    (c) non-magnetic follower means disposed opposite said guide means and engaging the opposite surface of said web;
    (d) means for mounting said follower means for movement toward and away from said guide means by distances substantially equal to changes in the thickness of the web;
    (e) a flexible elongated beam fixed at one end to said follower means and having a predetermined flexing zone;
    (f) a magnet secured adjacent the free end of said beam within the magnetic field of attraction created by said magnet and guide means and adapted to move toward and away from said web to flex said beam in said flexing zone as said follower moves toward and away from said guide means upon changes in thickness of said web;
    (g) electrically resistive material disposed on opposite surfaces of said beam in said flexing zone and adapted to flex therewith;
    (h) conductors for connecting each of said resistive materials to a source of potential; and
    (i) circuit means connecting said resistive materials together for translating flexing of said material on opposite sides of the beam caused by movement of said magnet toward and away from said web into an electrical signal representative of the thickness of said web.

12. Apparatus for measuring the thickness of a moving web of non-magnetic material comprising:
 (a) ferromagnetic guide means;
 (b) feeding means for moving a web of non-magnetic material along the guide means with one surface of the web in engagement therewith;
 (c) a non-magnetic elongated follower disposed opposite said guide means along the line of movement of said web;
 (d) means for urging said follower into continuous engagement with the opposite side of said web and for movement toward and away from said guide means by distances substantially equal to changes in the thickness of said moving web;
 (e) a support bracket fixed at one end of said follower and extending in a direction away from said guide means;
 (f) an elongated flexible beam having a predetermined flexing zone fixed at one end to the other end of said support bracket and extending in the direction of movement of said web;
 (g) a magnet adjustably secured to the free end of the beam between said follower and beam and within the magnetic field of attraction created by said magnet and ferromagnetic guide means for flexing said beam in said flexing zone by amounts proportional to changes in thickness of said web;
 (h) fluid damping means operatively connected between said magnet and follower;
 (i) a pair of electrically resistive materials disposed on each surface of said beam in said flexing zone and adapted to flex therewith with the resistive materials on one surface of said beam disposed directly opposite the resistive materials on the opposite surface and each extending in a direction along the length of said beam;
 (j) conductors for connecting each of said resistive materials to a source of potential; and
 (k) circuit means for connecting said resistive materials together to form a Wheatstone bridge circuit with the resistive materials on one side of said beam forming opposite legs of said bridge whereby changes in the resistance of the materials on opposite sides of said beam caused by flexing of said beam will produce an electrical signal representative of the thickness of said web.

13. Apparatus for measuring the thickness of a moving web of material comprising:
 (a) support means;
 (b) a movable follower connected to said support means and adapted to face one side of said web and move toward and away from the opposite side thereof, as the thickness of the web varies, by distances directly proportional to the changes in said thickness;
 (c) a flexible beam;
 (d) means for connecting said beam to said support means in spaced relationship with respect to said web and with one end thereof positioned at a fixed distance from one of the sides of said web, said beam having a predetermined flexing zone; and
 (e) sensing means secured to the other end of said beam in a position spaced from said web for flexing said beam in said flexing zone from a reference position toward and away from the side of the web defined in paragraph (d) by distances proportional to decreases and increases in the thickness of the web as determined by the movement of said follower.

14. Apparatus for measuring the thickness of a moving web of non-magnetic material comprising:
 (a) support means;
 (b) a magnet couple including a ferromagnetic member and a magnet member connected to said support means and adapted to be positioned on opposite sides of said web with one of said members spaced from one side of said web and the other member engaging the opposite side thereof within the magnetic field of attraction created by said couple;
 (c) a flexible cantilever beam;
 (d) means for connecting said beam at one end to said support means on said one side of the web and in spaced relationship with respect thereto with said one end positioned at a fixed distance from said one side, said beam having a predetermined flexing zone;
 (e) means for supporting said one member of said magnet couple at the other end of said beam; and
 (f) means for moving the members of said magnet couple relatively toward and away from each other as the thickness of the web varies, by distances directly proportional to changes in said thickness to respectively increase and decrease the magnetic field of attraction between the two members of said couple and flex said beam in said flexing zone toward and away from said one side of the web by amounts directly proportional to the change in thickness of said web.

15. Apparatus for measuring the thickness of a moving web of non-magnetic material as set forth in claim 14 further comprising:
 (a) means responsive to flexing of said beam for producing a signal representative of the thickness of said web.

References Cited by the Examiner
UNITED STATES PATENTS

| | | | |
|---|---|---|---|
| 2,581,264 | 1/1952 | Levesque | 33—147 |
| 2,637,115 | 5/1953 | Watson | 324—34 |
| 2,637,552 | 5/1953 | Watson | 271—57 |
| 2,666,262 | 1/1954 | Ruge | 33—147 |

RICHARD B. WILKINSON, *Primary Examiner.*